(12) United States Patent
Yang et al.

(10) Patent No.: US 12,736,770 B2
(45) **Date of Patent: *Sep. 15, 2026**

(54) SPACER AND CAMERA MODULE INCLUDING THE SAME

(71) Applicant: SAMSUNG ELECTRO-MECHANICS CO., LTD., Suwon-si (KR)

(72) Inventors: So Mi Yang, Suwon-si (KR); Jin Se Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/884,717

(22) Filed: Sep. 13, 2024

(65) Prior Publication Data

US 2025/0004241 A1 Jan. 2, 2025

Related U.S. Application Data

(63) Continuation of application No. 17/189,564, filed on Mar. 2, 2021, now Pat. No. 12,130,491.

(30) Foreign Application Priority Data

Nov. 9, 2020 (KR) ........................ 10-2020-0148261

(51) Int. Cl.

| | |
|---|---|
| ***G02B 7/02*** | (2021.01) |
| ***G03B 17/12*** | (2021.01) |
| *G02B 13/00* | (2006.01) |

(52) U.S. Cl.

CPC ............ *G02B 7/021* (2013.01); *G03B 17/12* (2013.01); *G02B 13/0065* (2013.01)

(58) Field of Classification Search

CPC ........ G03B 17/12; G03B 17/17; G02B 7/021; G02B 7/18; G02B 7/1805; G02B 7/182; G02B 13/0065

See application file for complete search history.

(56) References Cited

U.S. PATENT DOCUMENTS

| | | | |
|---|---|---|---|
| 6,161,966 | A | 12/2000 | Chang et al. |
| 8,456,769 | B2 | 6/2013 | Teraoka et al. |

(Continued)

FOREIGN PATENT DOCUMENTS

| | | | |
|---|---|---|---|
| CN | 101393314 | A | 3/2009 |
| CN | 201852982 | U | 6/2011 |

(Continued)

OTHER PUBLICATIONS

Taiwanese Office Action issued on Dec. 6, 2021 in counterpart of Taiwanese Patent Application No. 110108235 (5 pages in English and 5 pages in Mandarin).

(Continued)

*Primary Examiner* — Stephanie E Bloss
*Assistant Examiner* — Fang-Chi Chang
(74) *Attorney, Agent, or Firm* — NSIP Law

(57) ABSTRACT

A lens module includes a lens barrel, including a first lens and a second lens arranged along an optical axis, and a spacer disposed between the first lens and the second lens along the optical axis, and defining a hole corresponding to the optical axis and an opening that is open in a direction intersecting the optical axis.

14 Claims, 4 Drawing Sheets

(56) References Cited

U.S. PATENT DOCUMENTS

| | | | | |
|---|---|---|---|---|
| 11,460,692 | B2 | 10/2022 | Yang et al. | |
| 2009/0080094 | A1 | 3/2009 | Chen | |
| 2012/0019905 | A1 | 1/2012 | Teraoka et al. | |
| 2016/0139359 | A1 | 5/2016 | Lin et al. | |
| 2017/0160511 | A1 | 6/2017 | Kim et al. | |
| 2018/0109660 | A1 | 4/2018 | Yoon et al. | |
| 2019/0377150 | A1 | 12/2019 | Takama et al. | |
| 2020/0088972 | A1 | 3/2020 | Yoo et al. | |
| 2020/0409020 | A1 | 12/2020 | Yedid et al. | |
| 2021/0132373 | A1 | 5/2021 | Yang et al. | |
| 2024/0012183 | A1* | 1/2024 | Jin | G02B 5/003 |

FOREIGN PATENT DOCUMENTS

| | | | | |
|---|---|---|---|---|
| CN | 102227663 | A | 10/2011 | |
| CN | 204359995 | U | 5/2015 | |
| CN | 109960093 | A | 7/2019 | |
| CN | 110554472 | A | 12/2019 | |
| CN | 211206929 | U | 8/2020 | |
| CN | 111684333 | A | 9/2020 | |
| CN | 211653365 | U | 10/2020 | |
| JP | 2004-145057 | A | 5/2004 | |
| JP | 2008304642 | A * | 12/2008 | |
| JP | 2010008862 | A * | 1/2010 | |
| KR | 101253464 | B1 * | 4/2013 | G03B 3/02 |
| KR | 10-2015-0066899 | A | 6/2015 | |
| KR | 10-2017-0065955 | A | 6/2017 | |
| KR | 10-2018-0041040 | A | 4/2018 | |
| KR | 10-2020-0101409 | A | 8/2020 | |
| TW | 367050 | U | 8/1999 | |
| TW | 201011452 | A | 3/2010 | |
| WO | WO 2010/061604 | A1 | 6/2010 | |
| WO | WO 2019/167001 | A1 | 9/2019 | |

OTHER PUBLICATIONS

Korean Office Action issued on Dec. 23, 2021, in counterpart Korean Patent Application No. 10-2020-0148261 (8 pages in English and 6 pages in Korean).

Taiwanese Office Action issued on Jan. 19, 2024, in counterpart Taiwanese Patent Application No. 111137126 (9 pages in English, 7 pages in Chinese).

Chinese Office Action issued on Mar. 26, 2024, in counterpart Chinese Patent Application No. 202110770961.0 (5 pages in English, 9 pages in Chinese).

* cited by examiner

SPACER AND CAMERA MODULE INCLUDING THE SAME

CROSS-REFERENCE TO RELATED APPLICATION(S)

This application is a continuation of U.S. application Ser. No. 17/189,564 filed on Mar. 2, 2021, now U.S. Pat. No. 12,130,491 issued on Oct. 29, 2024, which claims the benefit under 35 USC 119 (a) of Korean Patent Application No. 10-2020-0148261 filed on Nov. 9, 2020 in the Korean Intellectual Property Office, the entire disclosures of which are incorporated herein by reference for all purposes.

BACKGROUND

1. Field

The following description relates to a spacer or a camera module including the same.

2. Description of the Background

Camera modules are standardly installed in mobile electronic devices such as mobile phones, laptop computers, and the like.

A general camera module may be manufactured to include a plurality of lenses, a lens barrel accommodating the plurality of lenses therein, an image sensor converting an optical signal, passing through the plurality of lenses, into an electric signal, a circuit board on which the image sensor is mounted, and a housing fixing the lens barrel to the circuit board.

The plurality of lenses may be aligned with each other along an optical axis by fitting the lenses into the lens barrel or bonding the lenses to the lens barrel. A spacer may be interposed between each of the plurality of lenses, aligned with each other along an optical axis, in the lens barrel. The spacer may adjust a separation distance between the plurality of lenses or may block unnecessary light, incident to the image sensor, to prevent flares from occurring.

The above information is presented as background information only, to assist in gaining an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

A spacer, capable of contributing to miniaturization or thinning of a lens module and a camera module.

In one general aspect, a lens module includes a lens barrel, including a first lens and a second lens arranged along an optical axis, and a spacer disposed between the first lens and the second lens along the optical axis, and defining a hole corresponding to the optical axis and an opening that is open in a direction intersecting the optical axis.

The opening may be open in a direction perpendicular to the optical axis.

The spacer may include a sidewall defining the hole, and the opening may be disposed in the sidewall.

An area of the opening may be in a range of 10% to 80% of an area of the sidewall.

The sidewall may include a first sidewall and a second sidewall opposing the first sidewall, and the opening may be disposed in a portion of the first sidewall and a portion of the second sidewall.

The spacer may be in contact with the first lens, and may include an upper surface having a closed curve extending along an edge of the first lens.

The spacer may be in contact with the second lens, and may include a lower surface having a closed curve extending along an edge of the second lens.

A surface of the spacer facing the first lens may include a pair of straight portions, opposing each other, and a pair of curved portions, opposing each other, and the straight portions and the curved portions may be alternately connected to each other.

A surface of the spacer facing the second lens may include a pair of straight portions, opposing each other, and a pair of curved portions, opposing each other, and the straight portions and the curved portions may be alternately connected to each other.

The lens barrel may include a step between the first lens and the second lens, and the opening may be disposed in a portion of the spacer corresponding to the step.

A thickness of the lens barrel in a first direction may vary based on the step, and the opening may be open in the first direction.

In another general aspect, a camera module includes a lens barrel, a first lens and a second lens arranged along an optical axis in the lens barrel, and a spacer disposed in the lens barrel between the first lens and the second lens. A portion of the lens barrel is exposed to an internal space of the spacer through an opening disposed in the spacer.

The camera module may include a reflection member configured to reflect light, incident in the first direction, to the lens module.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
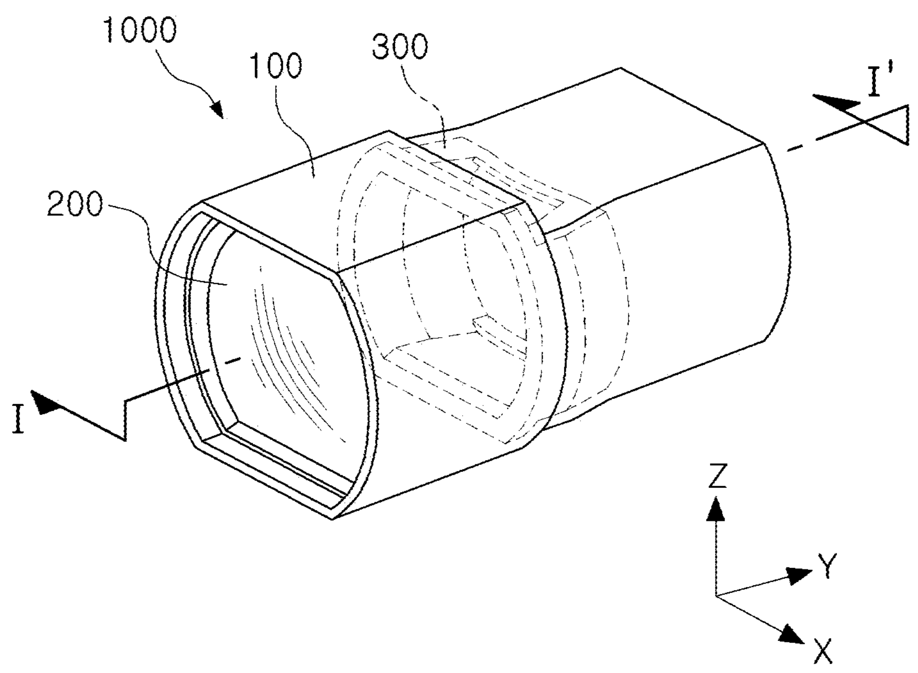
FIG. 1 is a perspective view of a lens module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being “on,” “connected to,” or “coupled to” another element, it may be directly “on,” “connected to,” or “coupled to” the other element, or there may be one or more other elements intervening therebetween. In contrast, when an element is described as being “directly on,” “directly connected to,” or “directly coupled to” another element, there can be no other elements intervening therebetween. As used herein “portion” of an element may include the whole element or less than the whole element.

As used herein, the term “and/or” includes any one and any combination of any two or more of the associated listed items; likewise, “at least one of” includes any one and any combination of any two or more of the associated listed items.

Although terms such as “first,” “second,” and “third” may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as “above,” “upper,” “below,” “lower,” and the like, may be used herein for ease of description to describe one element’s relationship to another element as illustrated in the figures. Such spatially relative terms are intended to encompass different orientations of the device in use or operation in addition to the orientation depicted in the figures. For example, if the device in the figures is turned over, an element described as being “above,” or “upper” relative to another element would then be “below,” or “lower” relative to the other element. Thus, the term “above” encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles “a,” “an,” and “the” are intended to include the plural forms as well, unless the context clearly indicates otherwise. The terms “comprises,” “includes,” and “has” specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term “may” with respect to an example, for example, as to what an example may include or implement, means that at least one example exists in which such a feature is included or implemented while all examples are not limited thereto.

Figure 2:
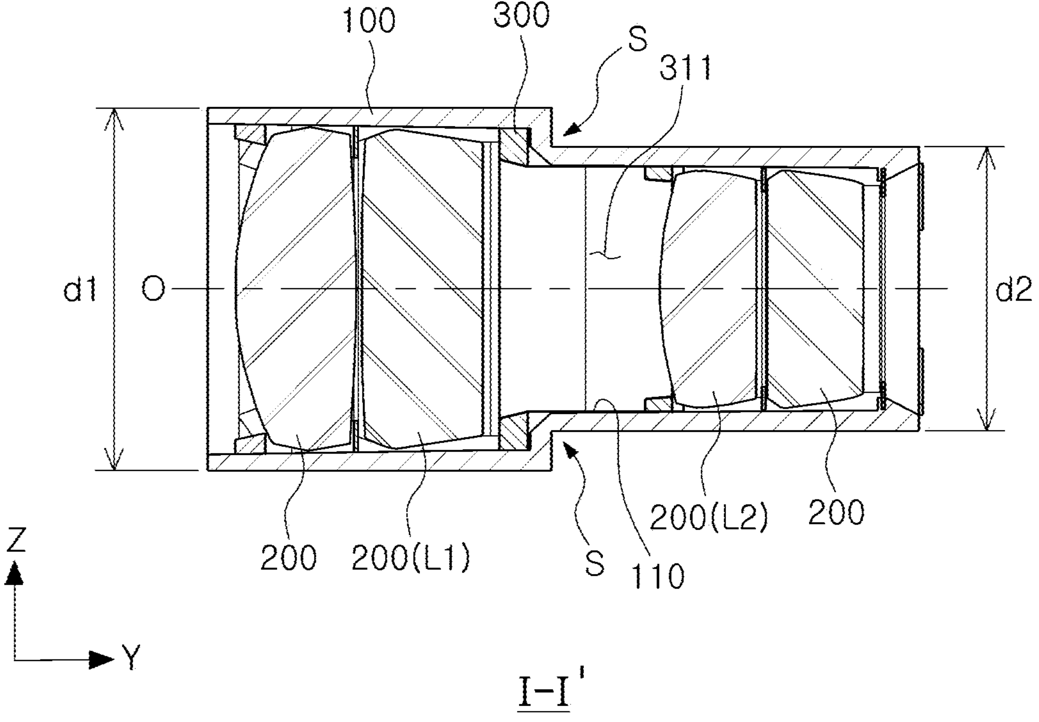
FIG. 2 is a cross-sectional view taken along line I-I' of FIG. 1.
Figure 3:
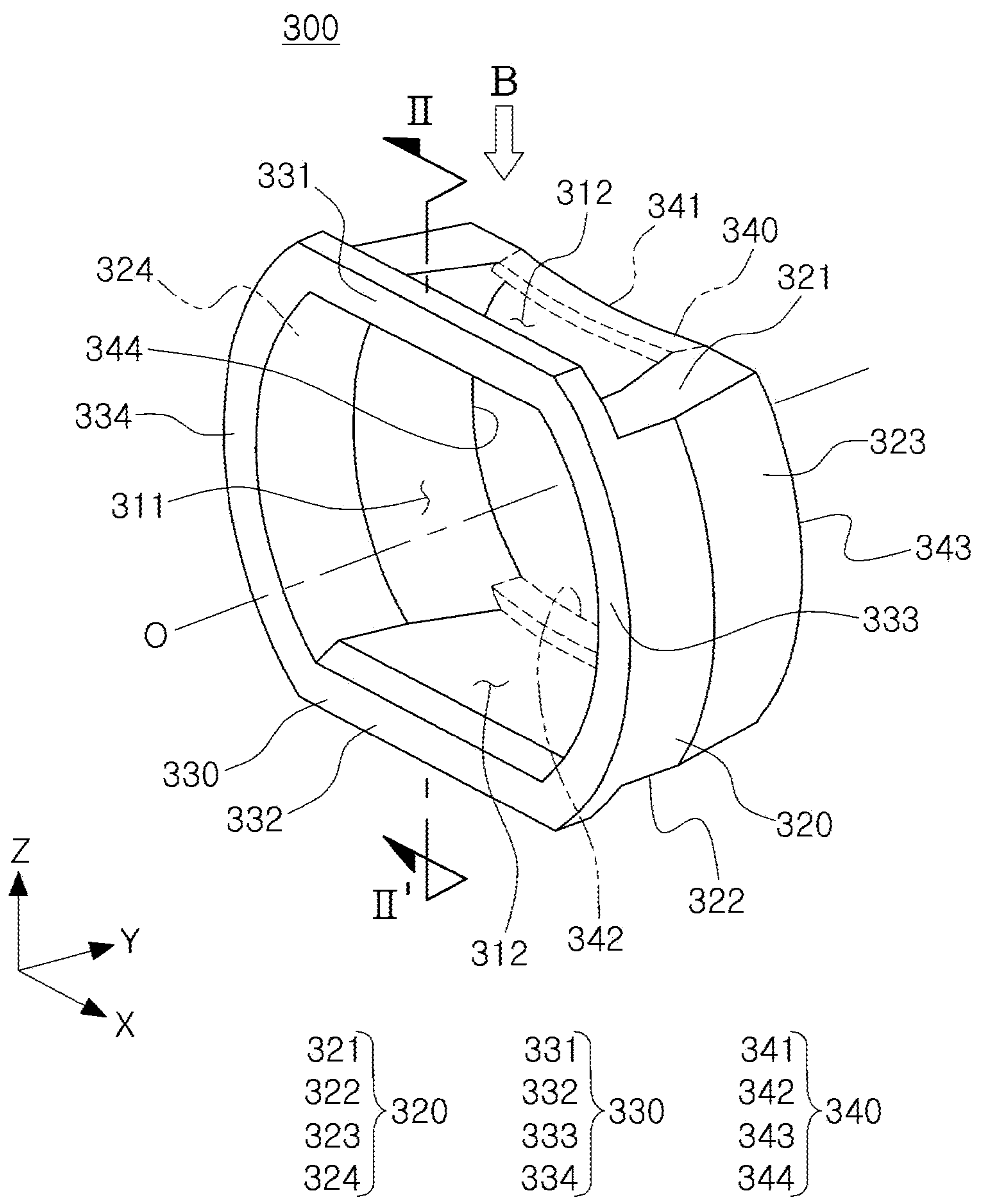
FIG. 3 is a perspective view of a spacer according to an example.
Figure 4:
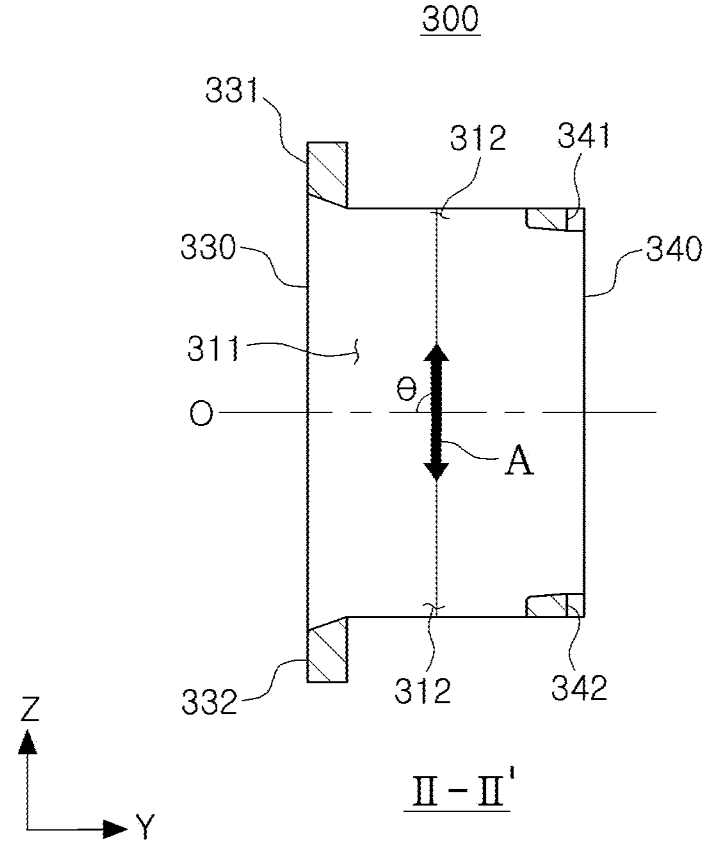
FIG. 4 is a cross-sectional view taken along line II-II' of FIG. 3.
Figure 5:
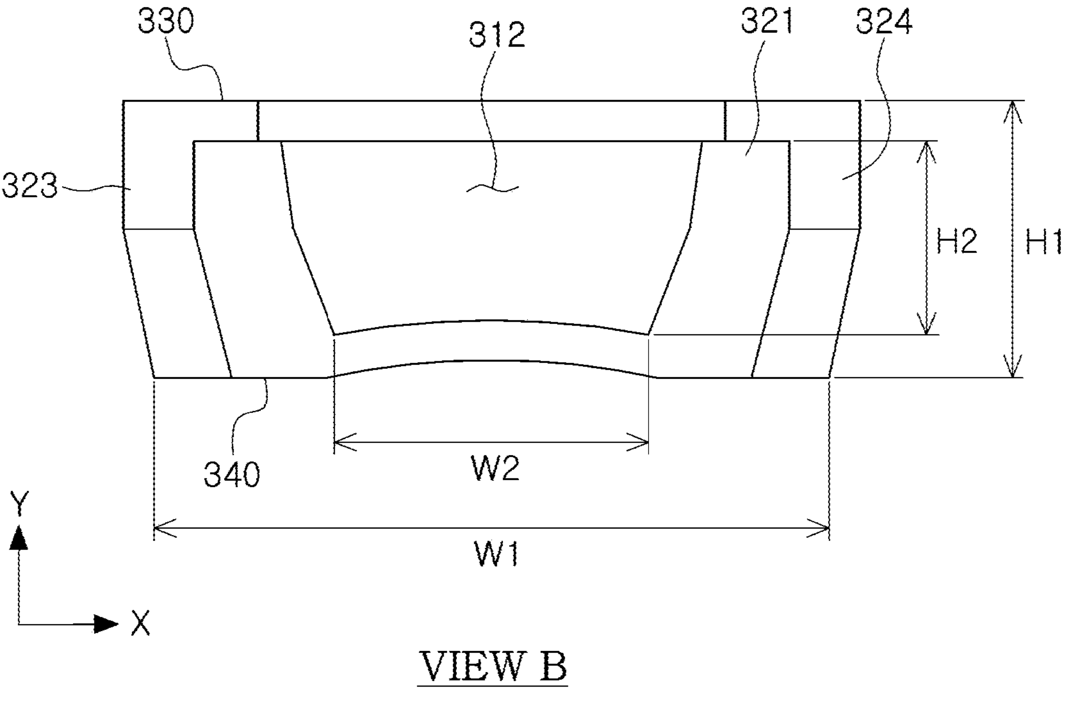
FIG. 5 is a view illustrating a spacer when viewed in direction 'B' of FIG. 3.

FIG. 1 is a perspective view of a lens module 1000 according to an example. FIG. 2 is a cross-sectional view taken along line I-I' of FIG. 1. FIG. 3 is a perspective view of a spacer 300 according to an example. FIG. 4 is a cross-sectional view taken along line II-II' of FIG. 3. FIG. 5 is a view illustrating the spacer 300 when viewed in direction ‘B’ of FIG. 3.

Referring to FIGS. 1 and 2, the lens module 1000 may include a lens barrel 100 and lenses 200 accommodated in the lens barrel 100. The lenses 200 may be arranged on the optical axis O. In the illustrated example, four lenses 200 may be accommodated in the lens barrel 100, but this is only an example. In other examples, the lens module 1000 may include various numbers of lenses 200.

In an example, the lens module 1000 may include a spacer 300 between the lenses 200. For example, the spacer 300 may be disposed between a first lens L1 and a second lens L2. The spacer 300 may be used to maintain a gap between the lenses 200. For example, the spacer 300 may be in at least partial contact with the lenses 200 provided on both sides of the spacer 300, and a gap between the lenses 200 provided on both sides of the spacer 300 may be maintained by a length of the spacer 300.

Referring to FIG. 3, in an example, the spacer 300 may include a path for light passing between the lenses 200 on both sides of the spacer 300. For example, the spacer 300 may have a hole 311 along the optical axis O. Light, passing through the first lens L1, may reach the second lens L2 after passing through the hole 311 of the spacer 300. The hole 311 may be provided to significantly reduce interference between the light and the spacer 300 while the light travels from the first lens L1 to the second lens L2.

In an example, the spacer 300 may have an opening 312 open in a direction intersecting the optical axis O. Referring to FIG. 4, an angle ⊖ formed in a direction ‘A’, in which the opening 312 is exposed, and the optical axis O may be greater than zero degree to less than 180 degrees. For example, the opening 312 may be open in a direction, perpendicular to the optical axis O.

In an example, a side surface of the spacer 300 may be provided with the opening 312. In an example, the spacer 300 may have a sidewall 320 extending in a direction parallel to the optical axis O, and a portion of the sidewall 320 is penetrated to define the opening 312.

Referring to FIG. 2, in an example, a portion of the lens barrel 100 may be exposed to the opening 312 of the spacer 300. Thus, the portion of the lens barrel 100 may be exposed to an internal space of the spacer 300 (for example, a space corresponding to the hole 311).

In an example, the spacer 300 may have a side surface (or a sidewall) extending in an optical axis direction. When the spacer 300 is assembled in the lens barrel 100, the side surface of the spacer 300 may face an internal circumferential surface 110 of the lens barrel 100. Since the side surface of the spacer 300 is provided with the opening 312, a portion of the internal circumferential surface 110 of the lens barrel 100 may be exposed to the internal space of the spacer 300. For example, when viewed from the optical axis, a portion of the internal circumferential surface 110 of the lens barrel 100 may be shown.

In an example, when the spacer 300 is provided between the first lens L1 and the second lens L2, the spacer 300 may be surrounded by a portion of the internal circumferential surface 110, surrounding a space between the first lens L1 and the second lens L2, of the lens barrel 100. In addition, the portion of the internal circumferential surface 110 may be exposed inwardly of the spacer 300 through the opening 312.

In an example, the opening 312 may be provided on each of two side surfaces, opposing each other. In an example, the spacer 300 may have a first side wall 321 and a second side wall 322 opposing each other. Each of the first side wall 321 and the second side wall 322 may define the opening 312. The spacer includes a third side wall 323 and a fourth side wall 324 that connect the first side wall 321 to the second side wall 322.

In an example, an area of the opening 312 may account for 10% or more of a surface on which the opening 312 is present. In an example, an upper limit of the area of the opening 312 may be 7 $mm^2$, and a lower limit of the area of the opening 312 may be 1 $mm^2$. When the area is greater than the upper limit, the spacer 300 may be structurally unstable.

Referring to FIG. 5, in an example, a ratio of a value, obtained by multiplying lower width W2 by height H2 of the opening 312, to a value, obtained by multiplying overall width W1 and overall height H1 of the spacer 300, may range from 0.1 to 0.8.

In the illustrated example, the opening 312 may have a trapezoidal shape, but this is only an example. In other examples, the opening 312 may have various shapes. For example, the opening 312 may have a circular shape or a polygonal shape.

In the illustrated example, the openings 312 may be symmetrically provided on the first and second sidewalls 321 and 322, opposing each other, but this is only an example. In other examples, the openings 312, respectively provided on the first and second sidewalls 321 and 322 opposing each other, may have different shapes.

In an example, an upper surface 330 and a lower surface 340 of the spacer 300 may be in at least partial contact with the first lens L1 and the second lens L2, respectively. In an example, the upper surface 330 and the lower surface 340 of the spacer 300 may define an upper opening and a lower opening of the hole 311, respectively.

In an example, the spacer 300 may have a shape corresponding to a lens (for example, the first lens L1 or the second lens L2) provided on one side of the spacer 300. For example, the upper surface 330 and the lower surface 340 of the spacer 300 may have a shape of loop (or ring) extending along an edge of the lens in contact with the upper and the lower surfaces 330 and 340. When the lens disposed on one side of the spacer 300 includes a D-cut portion, the spacer 300 may also have a shape corresponding to the D-cut portion of the lens.

In an example, the upper surface 330 and/or the lower surface 340 of the spacer 300 may have a closed curve shape. In an example, an opening surrounded by the upper surface 330 and/or the lower surface 340 may be distinguished from the opening 312.

Referring to FIG. 3, the upper surface 330 of the spacer 300 may include a first straight portion 331 and a second straight portion 332 and a first curved portion 333 and a second curved portion 334. The first straight portion 331 and the second straight portion 332 may oppose each other with the optical axis O interposed therebetween. The first curved portion 333 and the second curved portion 334 may oppose each other with the optical axis O interposed therebetween. Both ends of the first straight portion 331 may be connected to the first curved portion 333 and the second curved portion 334, respectively. Both ends of the second straight portion 332 may be connected to the first curved portion 333 and the second curved portion 334, respectively.

Referring to FIG. 3, the lower surface 340 of the spacer 300 may include a third straight portion 341 and a fourth straight portion 342 and a third curved portion 343 and a fourth curved portion 344. The third straight portion 341 and the fourth straight portion 342 may oppose each other with the optical axis O interposed therebetween. The third curved portion 343 and the fourth curved portion 344 may oppose each other with the optical axis O interposed therebetween. Both ends of the third straight portion 341 may be connected to the third curved portion 343 and the fourth curved portion 344, respectively. Both ends of the fourth straight portion 342 may be connected to the third curved portion 343 and the third curved portion 344, respectively.

In another example, a portion of the third and fourth straight portions 341 and 342 of the spacer 300 may be omitted. In this case, the opening 312 may be open in a positive Y direction.

In an example, the straight portions and the curved portions may be alternately connected to form a closed curve. The first straight portion 331, the second straight portion 332, the first curved portion 333, and the second curved portion 334, constituting the upper surface 330, may define a single closed curve. The third straight portion 341, the fourth straight portion 342, the third curved portion 343, and the fourth curved portion 344, constituting the lower surface 340, may define a single closed curve.

Returning to FIG. 2, in an example, the lens module 1000 may have steps S in the optical axis (O) direction. In an example, the lens barrel 100 may have different thicknesses based on the steps S. For example, based on the steps S, one side of the lens barrel 100 may have a first thickness d1 in a Z-axis direction, and the other side of the lens barrel 100 may have a second thickness d2 in the Z-axis direction.

In an example, the spacer 300 may be provided in a position corresponding to the step S. For example, a position of the step S in the optical axis (O) direction may be present between the upper surface 330 and the lower surface 340 of the spacer 300.

In an example, the spacer 300 may have a shape corresponding to the step S of the lens barrel 100. In an example, the opening 312 of the spacer 300 may be provided in a portion corresponding to the step S. In an example, when the lens barrel 100 has a width varying in a first direction based on the step S, the opening 312 may be open in the first direction. Referring to FIG. 2, the thickness of the lens barrel 100 in the Z direction may vary based on the step S, and the opening 312 of the spacer 300 is open in the Z direction.

Since the spacer 300 includes the opening 312, the lens barrel 100 may have a step S in a portion corresponding to the spacer 300. Since the lens barrel 100 has the step S, a thickness of the camera module 2000 may be reduced.

Figure 6:
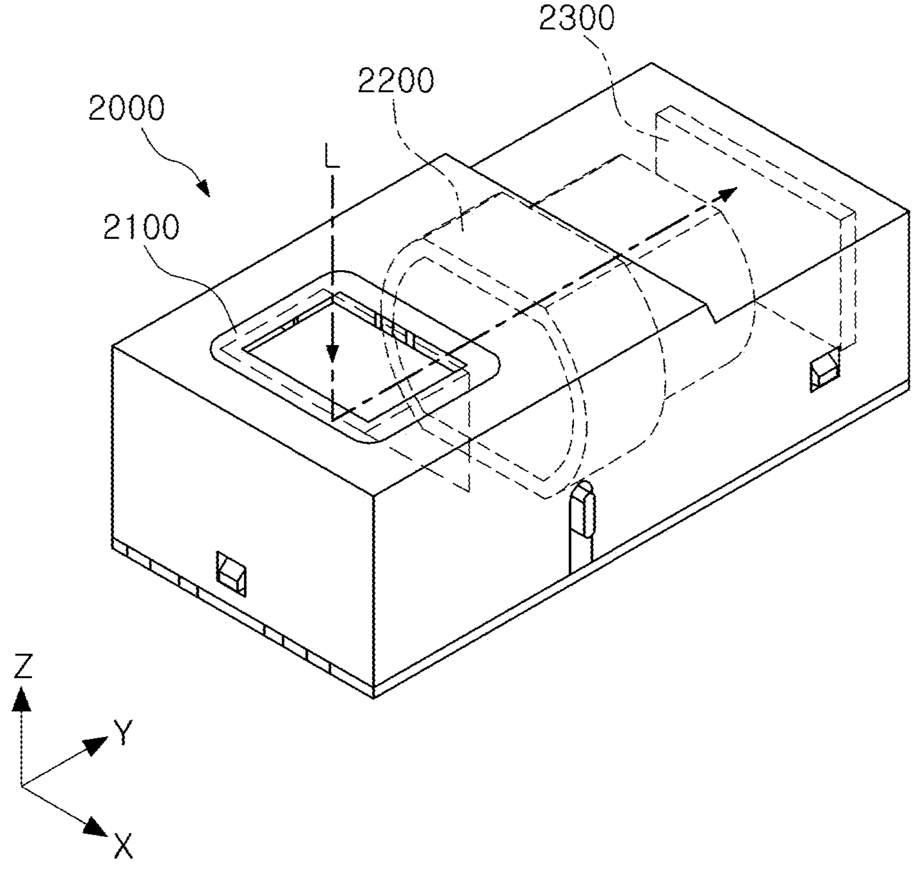
FIG. 6 is a perspective view of a camera module according to an example.

FIG. 6 is a perspective view of a camera module 2000 according to an example.

Referring to FIG. 6, in an example, the camera module 2000 may include a lens module 2200 (for example, the lens module 1000 of FIGS. 1 to 5) and an image sensor 2300 collecting light passing through the lens module 2200. In an example, the camera module 2000 may further include a reflection member 2100. The reflection member 2100 may convert light, incident in one direction, toward the lens module 2200. A total track length (TTL) could be increased to improve a high zoom magnification. As a length between a frontmost lens and the image sensor 2300 on an object side is increased, a thickness of the camera module 2000 is increased. In a mobile device such as a smartphone, which should have a small thickness, the camera module 2000 having a great thickness may damage an exterior of the mobile device.

In an example, the reflection member 2100 may convert light L, incident in a Z-axis direction, toward the lens module 2200. The light, reflected from the reflection member 2100, may have a direction parallel to or substantially parallel to an optical axis of the lens module 2200.

In an example, since the reflection member 2100 converts light once, it may be advantageous to reduce the thickness of the camera module while providing a high zoom magnification. For example, when light incident on a rear surface of the mobile device is converted by about 90 degrees by the reflection member 2100, the mobile device may be maintained to have a small thickness.

In an example, a thickness of the lens module 2200 in the Z-axis direction may be smaller in an image side than in the object side. The lens module 2200 may have thicknesses different based on a step S, and the spacer 300 described in FIGS. 1 to 5 may be provided in a portion corresponding to the step S.

In an example, when light incident on the reflection module 2100 is directed in a first direction (for example, a direction parallel to a Z-axis), a thickness of the lens barrel 100 in the first direction may vary based on the step S. In addition, an opening 312 of the spacer 300 may be open in a direction parallel to or substantially parallel to the first direction.

As described above, a lens module or a camera module, employing a spacer according to various examples, may have a small size.

While specific examples have been illustrated and described above, it will be apparent after gaining an understanding of this disclosure that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module comprising:

a lens barrel comprising a first lens and a second lens arranged along an optical axis; and a spacer disposed between the first lens and the second lens along the optical axis, and defining with a hole corresponding to the optical axis and an opening that is open in a direction intersecting the optical axis, wherein the spacer comprises:

a pair of curved portions;

a pair of straight portions extended between the pair of curved portions; and a sidewall extended from the pair of straight portions in an optical axis direction and in which the opening is disposed, wherein the lens barrel comprises a step, and wherein the position of the step in an optical axis direction is between an upper surface and a lower surface of the spacer.

2. The lens module of claim 1, wherein the opening is open in a direction perpendicular to the optical axis.

3. The lens module of claim 1, wherein an area of the opening is in a range of 10% to 80% of an area of the sidewall.

4. The lens module of claim 1, wherein the sidewall comprises a first sidewall and a second sidewall opposing the first sidewall, and the opening is disposed in a portion of the first sidewall and a portion of the second sidewall.

5. The lens module of claim 1, wherein the spacer is in contact with the first lens, and comprises the upper surface having a closed curve extending along an edge of the first lens.

6. The lens module of claim 1, wherein the spacer is in contact with the second lens, and comprises the lower surface having a closed curve extending along an edge of the second lens.

7. The lens module of claim 1, wherein a surface of the spacer facing the first lens comprises a pair of straight portions, opposing each other, and a pair of curved portions, opposing each other, and the straight portions and the curved portions are alternately connected to each other.

8. The lens module of claim 1, wherein a surface of the spacer facing the second lens comprises a pair of straight portions, opposing each other, and a pair of curved portions, opposing each other, and the straight portions and the curved portions are alternately connected to each other.

9. The lens module of claim 1, wherein the opening is disposed in a portion of the spacer corresponding to the step.

10. The lens module of claim 9, wherein a thickness of the lens barrel in a first direction varies based on the step, and the opening is open in the first direction.

11. A camera module comprising:

a lens barrel, a first lens and a second lens arranged along an optical axis in the lens barrel, and a spacer disposed in the lens barrel between the first lens and the second lens, wherein the spacer comprises:

a pair of curved portions;

a pair of straight portions extended between the pair of curved portions; and a sidewall extended from the pair of straight portions in an optical axis direction, wherein a portion of the lens barrel is exposed to an internal space of the spacer through an opening disposed in the sidewall of the spacer.

12. The camera module of claim 11, wherein the lens barrel comprises a step between the first lens and the second lens, and the opening is disposed in a portion of the spacer corresponding to the step.

13. The camera module of claim 12, wherein a thickness of the lens barrel in a first direction varies based on the step, and the opening is open in the first direction.

14. The camera module of claim 13, further comprising:

a reflection member configured to reflect light, incident in the first direction, to the lens module.

* * * * *